Nov. 12, 1957 D. V. TUTTLE 2,813,161
COMBINATION CONTROLLER AND TIMER
Filed June 14, 1954 5 Sheets-Sheet 2
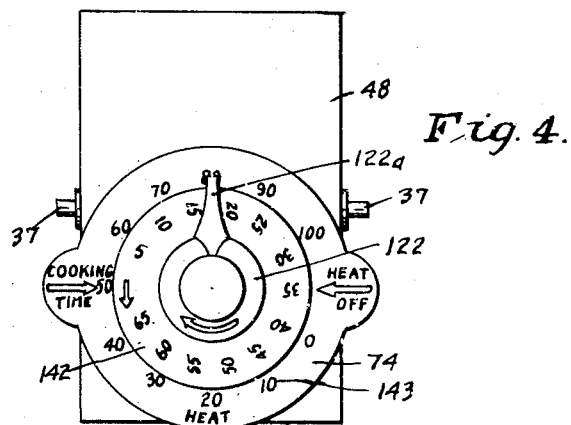
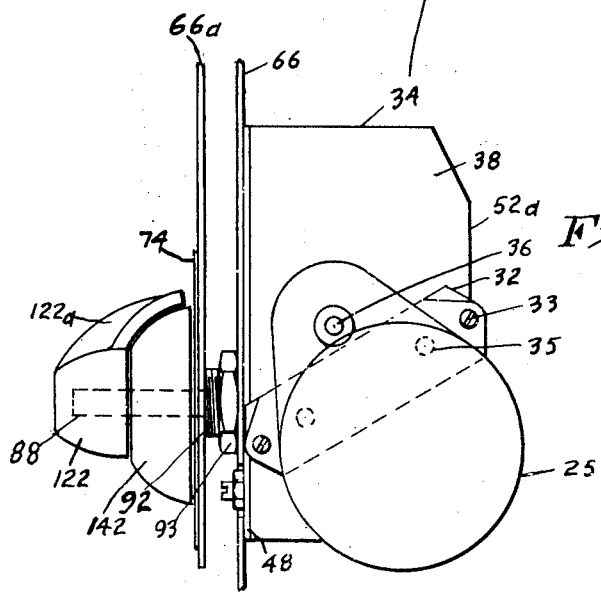
INVENTOR.
DANIEL V. TUTTLE
BY
*L. A. Paley*
Att'y.

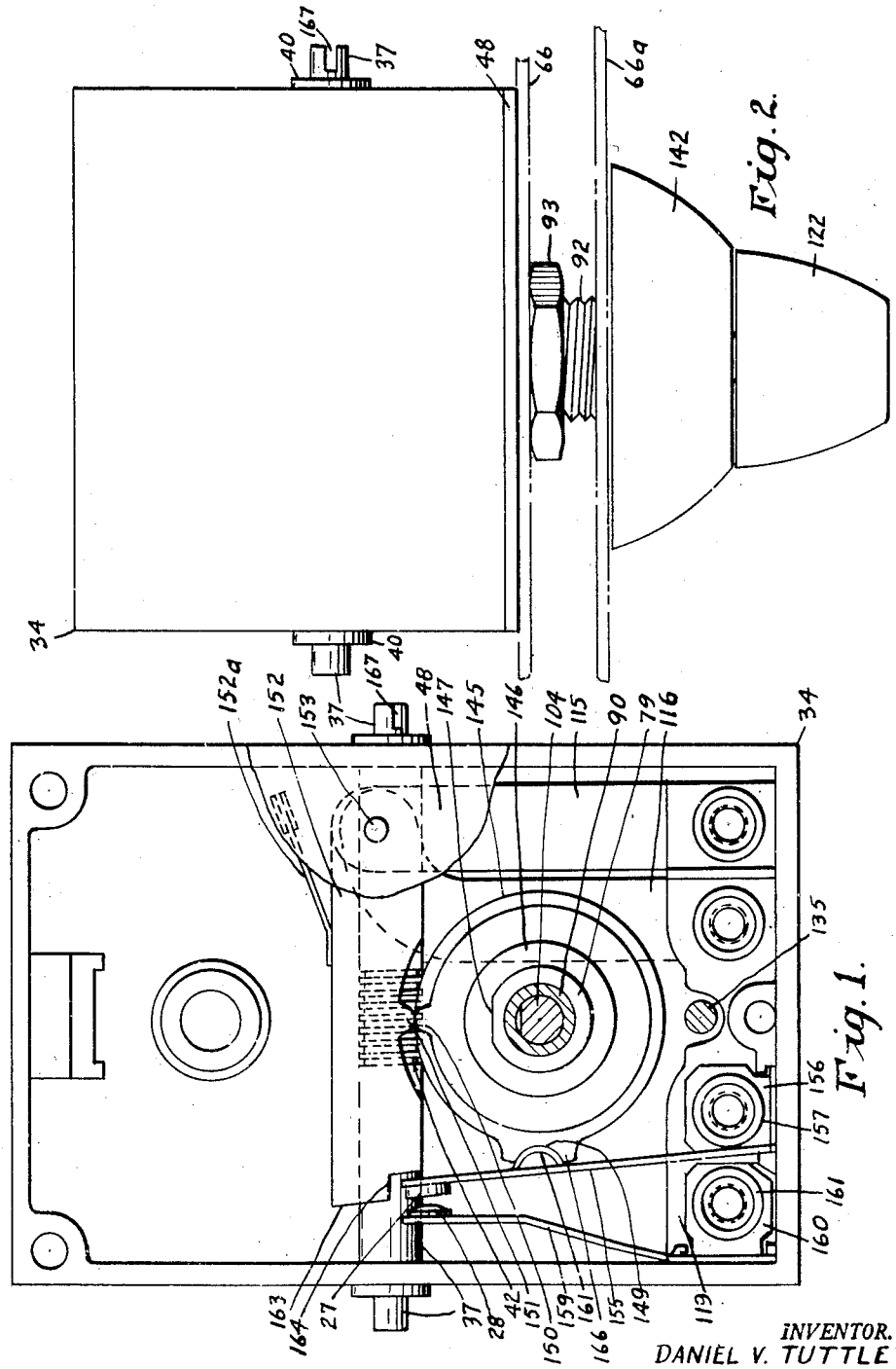

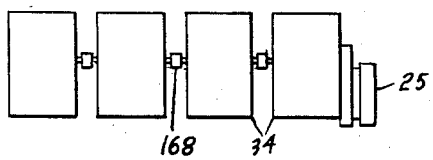
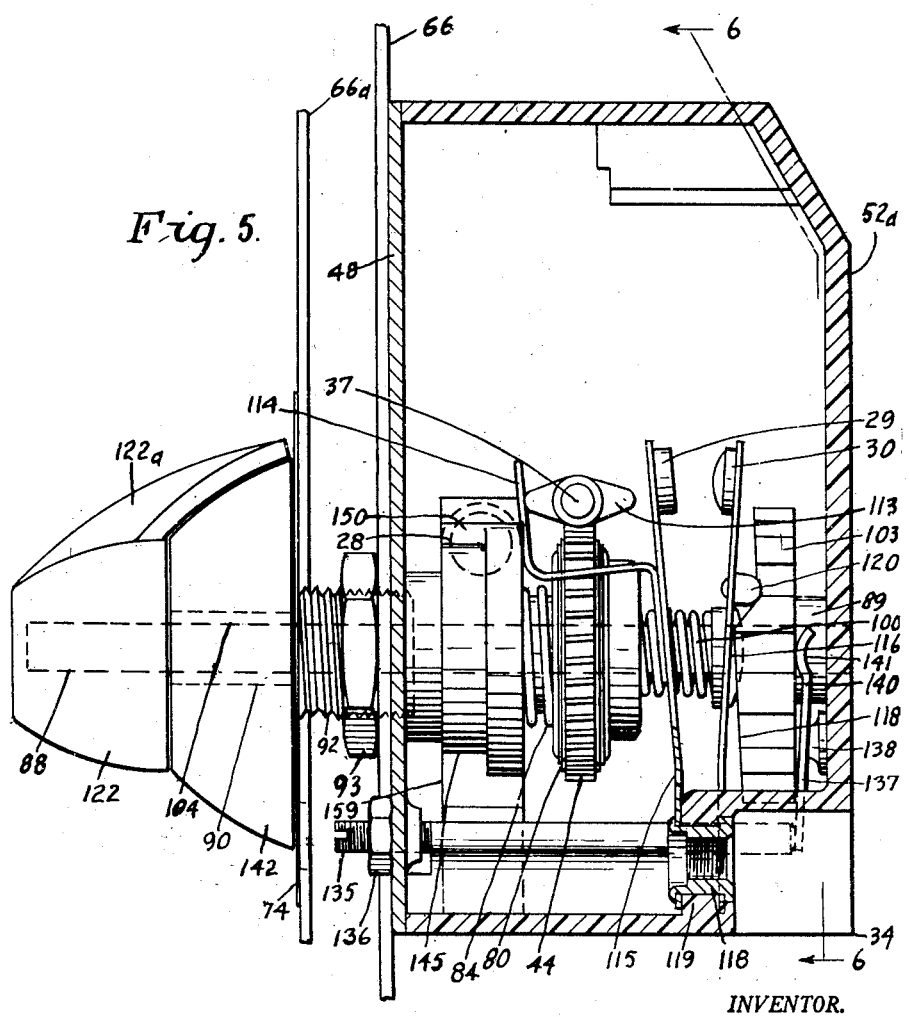

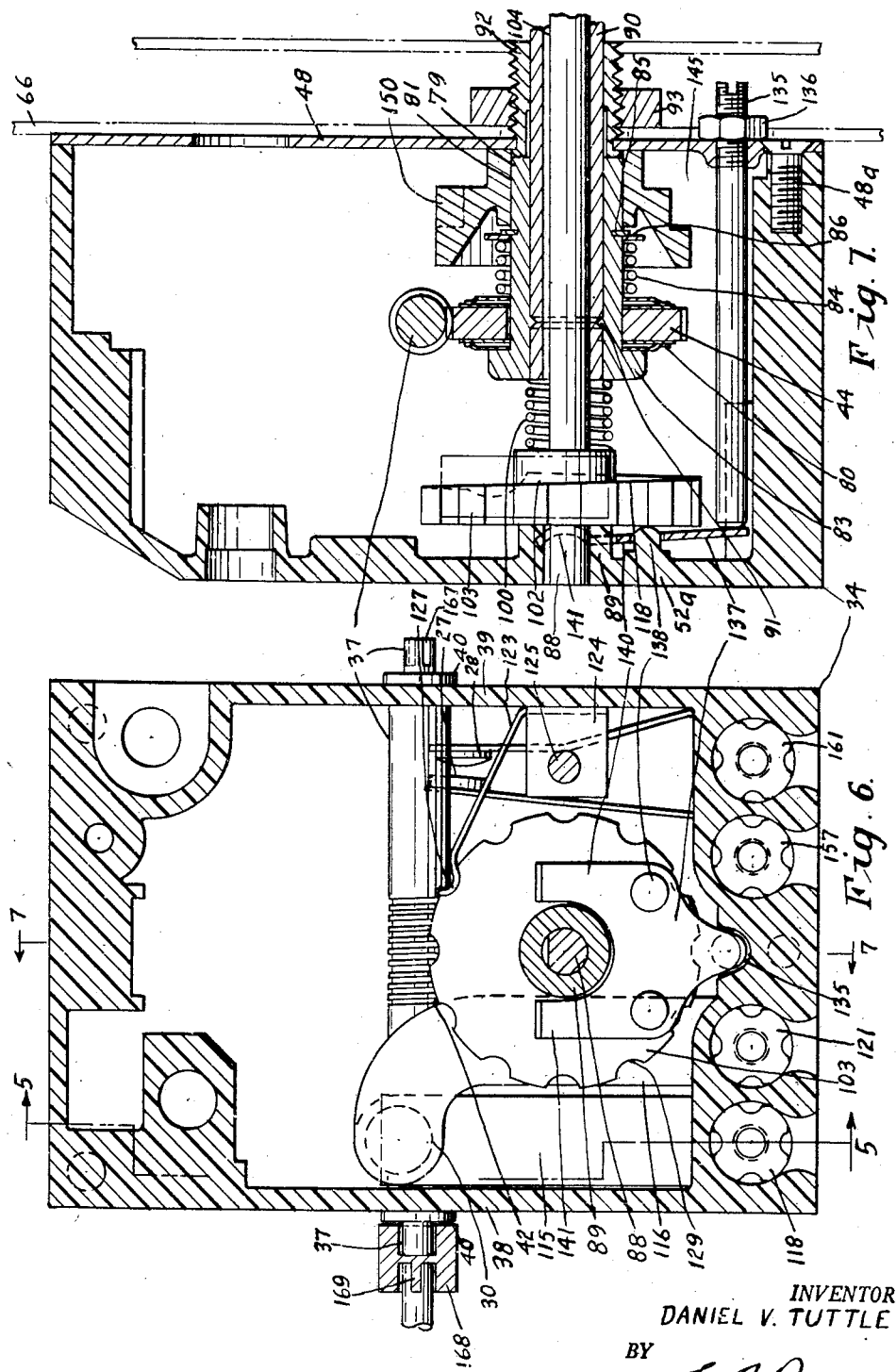

INVENTOR.
DANIEL V. TUTTLE
BY L.A.Paley
Atty.

United States Patent Office 2,813,161
Patented Nov. 12, 1957

2,813,161

COMBINATION CONTROLLER AND TIMER

Daniel V. Tuttle, Kirkland, Ill., assignor, by mesne assignments, to Tuttle & Kift, Inc., Chicago, Ill., a corporation of Illinois Application June 14, 1954, Serial No. 436,471

5 Claims. (Cl. 200—38)

This invention relates to automatic controls for domestic cooking ranges, industrial ovens, heating elements, electric pulse devices and electrical circuits.

In the conventional electric range, the operation of the oven is usually controlled by a clock. Control knobs are adjusted so that the oven turns on and off automatically at predetermined times to cook the food in the oven. No effort is made to automatically control the operation of the burners at the top of the range. Bimetallic thermostats are used in general in domestic ranges, and these are not reliable and lead to numerous burnouts of heating elements with large replacement costs. No effort is made to control the cycling of the electric current during the cooking period.

An object of the invention is to automatically control the cycling of current and temperature in the heat zone.

Another object of the invention is to automatically control time and temperature in the heat zone without the use of bimetallic elements.

A further object of the invention is to regulate the temperature in the heat zone by varying the time of energizing the electric heating element during each pulsation of current; also to improve electric controls in other respects hereinafter specified and claimed.

Figure 9:
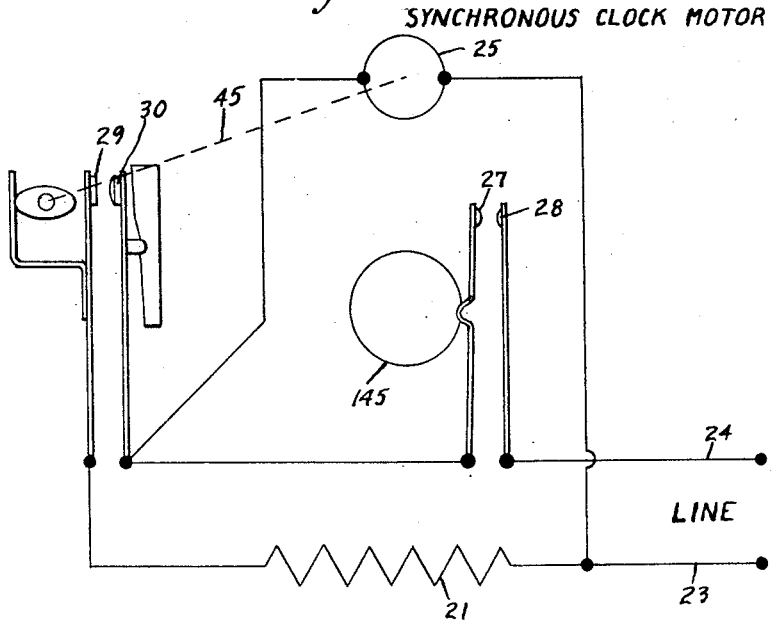
Figure 8:
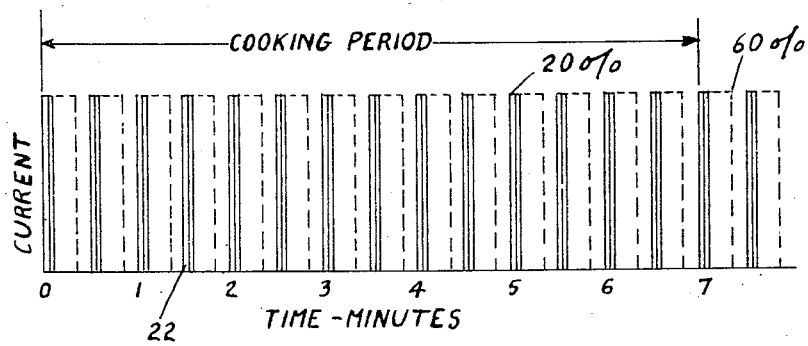

Reference is to be had to the accompanying drawings forming a part of this specification, in which:

Fig. 1 is an elevation of the switch with cover removed,
Fig. 2 is a top view of the control device,
Fig. 3 is a side view of the control device showing the timing motor in place,
Fig. 4 is a front view of the control knobs and dial,
Fig. 5 is a sectional view taken on line 5—5 of Fig. 6,
Fig. 6 is a sectional view through the control device taken on line 6—6 of Fig. 5,
Fig. 7 is a sectional view through the device taken on line 7—7 of Fig. 6,
Fig. 8 is a graphical representation of the heating cycles produced by the improved electric controls,
Fig. 9 is a wiring diagram of the control device, and
Fig. 10 is a view showing a plurality of switch controls grouped together by means of shaft couplings.

The general purpose of this device involves the use of a combination timer and infinite control of any degree of heat during the cooking period from 3% to 100% of the load. The timer governs the length of time for the heating element to be in operation. The power operating the motor is used in the infinite control to energize the heating element.

Referring to Figs. 8 and 9 of the drawings, the current is caused to be pulsating by the automatic controls to be hereinafter described so that spaced periods of heating 22 are produced at full heat during the cooking period. The shaded portion of Fig. 8 indicates electric power. The time of each pulsation of current may be adjusted by the controls from 3% to 100% of the load, thus controlling the temperature in the oven or other heating zone. The electric circuit of the invention, employs power lines 23 and 24 which branches to include in parallel a synchronous clock motor 25 and the heating element 21. A pair of switch contacts 27 and 28 and a pair of switch contacts 29 and 30 are included in the electrical circuit as will be more fully described.

The motor 25 may have an output speed of 1 R. P. M., and is attached to a spacing plate 32 by screws 33 (Fig. 3), said plate being attached to the side of a plastic molded case 34 by screws 35. The motor 25 has an output shaft 36 which is connected to a cam shaft 37 (Fig. 2), said shaft extending through side walls 38 and 39 of said case 34. The molded case 34 is more fully described in the application of Tuttle, Ser. No. 430,555, filed May 18, 1954. Suitable bearings 40 are provided in the side walls 38 and 39 to support the ends of shaft 37. A worm 42 is formed on the shaft 37, said worm meshing with a 4° spiral gear 44.

The gear 44 (Fig. 7) is rotatably mounted on a sleeve 79, and two pairs of clutch plates 80 are mounted on the sleeve 79 by means of D-holes engaging a flat 81 on one side of the sleeve 79, so that the clutch plates 80 are constrained to rotate with sleeve 79 but the gear 44 can rotate on sleeve 79 between the slip clutch plates 80. An annular should 83 is formed on one end of sleeve 79 and one pair of clutch plates 80 bears against the shoulder 83 to limit the axial movement of gear 44. A compression spring 84 is mounted on the sleeve 79 and a snap ring 85 engages an annular slot formed in the sleeve 79. Washer 86 is mounted on sleeve 79 and is interposed between the end of spring 84 and the snap ring 85. Thus the spring 84 normally tends to urge gear 44 and clutch plates 80 into contact with the shoulder 83.

A shaft 88 is rotatably mounted in a bearing 89 formed in the rear wall 52a of case 34. A sleeve 90 is secured concentrically to the inside of sleeve 79 by casting into an anchoring groove 91 so that sleeves 79 and 90 move together and are permitted to be rocked angularly about shaft 88, said shaft 88 passing through the inside of sleeve 90. One end of sleeve 90 is rotatably mounted in a bearing 92 which is secured in the cover 48 by riveting or swaging. A panel member 66 is interposed between the lock nut 93 and cover 48 to secure the switch device in position on panel 66. The end of sleeve 79 engages against the bearing 92 to prevent axial movement of sleeve 79. One end of a spring 100 bears against a hub 102 formed on a cam 103, and the other end of said spring bears against the end of sleeve 79. The hub 102 is anchored on the shaft 88 so that cam 103 rotates with shaft 88.

Cam shaft 37 is provided at one end with a double lobe cam 113 (Fig. 5) which engages a bracket 114 formed on a contact arm 115 to oscillate said contact arm 115 through small arcs to make and break contacts 29 and 30. The contact 29 is secured on the upper end of arm 115 and contact 30 is secured on the upper end of arm 116. The lower end of contact arm 115 is secured by a tapped rivet 118 to a boss 119 formed on the inside wall of case 34 for screw attachment of a wire conductor. The bottom end of arm 116 is secured by a tapped rivet 121 to the boss 119. The cam 103 (Fig. 5) has a spiral cam surface 118 formed on one of its faces, and a follower 120 is attached to a switch arm 116 by riveting, said follower being adapted to engage cam surface 118 and change the distance between contacts 29 and 30 when the cam 103 is rotated by means of a knob 122 which is secured to the outer end of shaft 88. A pointer 122a on knob 122 indicates percentage of heat on escutcheon plate or dial 74. A detent arm 123 (Fig. 6) has a transverse flange 124 at one end which is secured by rivet 125 to the rear wall 52a of case 34. The other end of arm 123 is provided with a semi-annular detent 127 which engages in grooves 129 formed in the periphery of cam 103. The purpose of this detent 127 is to lock the cam 103 in any desired adjusted angular position to regulate the distance between contacts 29 and 30.

The cam 103 is molded permanently upon the shaft 88, and rotates with said shaft 88. In order to adjust the cam 103 axially, I provide a set bolt 135 with a lock nut 136. The inner end of said bolt 135 engages the bottom of an adjusting lever 137 which is pivotally mounted on two studs 138, said studs being secured to the rear wall 52a of case 34. The upper end of lever 137 is bifurcated to partially enclose the bearing 89 to form two arms 140. The upper end of each arm 140 is provided with an arcuate contact member 141 which engages one face of cam 103 to move said cam slightly axially when the bolt 135 is screwed inwardly, thus adjusting the distance between contacts 27 and 28 for wear.

A knob 142 is fixed to sleeve 90 and turns cam 145 closing main switch contacts 27 and 28 and also slipping clutch 80. Cam 145 is provided with a hub 146 (Fig. 1) which is fixed on the sleeve 79 and rotates with said sleeve 79 when said sleeve is rotated. A cam slot 149 is formed at one point in the periphery of cam 145, and a protruding lobe 150 is formed on the outer periphery of cam 145 spaced apart by 90° from the groove 149. The lobe 150 and groove 149 are offset axially from one another on the outer periphery of cam 145. The lobe 150 is positioned to contact with a lobe 151 formed on the bottom face of a lever 152. One end of the lever 152 is pivotally mounted on case cover 48 by means of a pin 153, and is provided with a spring 152a secured to cover 48 to urge said lever 152 in a counterclockwise direction. A switch arm 155 is mounted adjacent cam 145 and has on its upper end switch contact 27. The lower end of arm 155 has a transversely extending flange 156 which is secured by a tapped rivet 157 to the boss 119 formed on case 34. The lower end of a switch arm 159 is provided with a transversely extending flange 160 which is secured by a tapped rivet 161 to the boss 119. The upper end of switch arm 159 carries the switch contact 28. A cam follower 161 is formed on switch arm 155 to engage in cam groove 149.

A sloping lock surface 163 is formed on one end of the lever 152 and a clearance slot 164 is formed adjacent said surface 153. When knob 142 is turned, lobe 166 adjacent groove 149 moves the switch arm 155 to cause contacts 27 and 28 to close, and thus starts the operation of motor 25 (Fig. 9) and current flowing through the heating element 21. The turning of cam 145 by knob 142 also causes lobe 150 to disengage from lobe 151 so that surface 163 engages behind the top of switch arm 155 to lock the contacts 27 and 28 in closed position during the entire cooking period.

As the sleeve 79 is rotated during the cooking period by gear 44, a time is reached at the end of the desired cooking period, when lobe 150 again engages lobe 151 to raise the lever 152 upwardly so that surface 163 disengages from the end of switch arm 155 to cause the contacts 27 and 28 to open with a snap action so as to stop the rotation of motor 25 and stop the passage of current through the heating element 21.

A number of switch boxes 34 (Fig. 10) may be grouped together, such as four as shown, and operated by a single motor 25. To do this I provide diametrical slots 167 (Fig. 2) one in each end of the shaft 37, said slots being 45° diametrically out of register to insure that any two switch boxes are not turned on simultaneously to produce an unduly large surge of current. A coupling 168 is provided with opposed driving lugs 169 to engage in the slots 167 to connect together the shafts 37 of the several switch boxes.

In operation, the housewife or other operator turns knob 122 to the percentage of heat desired as indicated on escutcheon plate 74, such as 40%, in the subsequent cooking operation. This operation causes the shaft 88 and cam 103 to rotate to a desired position depending upon the desired degree of heat, said position being yieldingly fixed by detent 127. The operator then turns knob 142 either clockwise or counterclockwise to the desired number of minutes of cooking operation, such as 55 minutes, and this turning of the knob causes sleeve 90 to rotate through an arc depending upon the minutes of cooking.

The turning of sleeve 90 (Fig. 1) turns cam 145 so that contacts 27 and 28 are closed by cam lobe 166 acting on follower 161, the lever 152 moving downwardly so that surface 163 engages behind switch arm 155 thus maintaining the contacts 27 and 28 in closed position. Closing of contacts 27 and 28 (Fig. 10) starts the operation of motor 25 and starts current passing through the heating element 21.

Follower 120 engages the cam surface 118 on cam 103, and the distance between contacts 29 and 30 is thus regulated by cam 103. The cam 113 now becomes effective to make and break contacts 29 and 30, and the switch device moves into the cooking period with current pulsating through heating element 21.

Gear 44 turns sleeve 90 (Fig. 7) slowly until cam lobe 150 engages lobe 151, so that stop surface 163 disengages contact arm 155, and contacts 27 and 28 are opened to stop the motor 25 and stop the flow of current through the heating element 21. Bolt 135 is adjusted to act on plate 137 and move the cam 103 slightly axially for fine adjustment of the distance between contacts 29 and 30. This is a shop adjustment for wear only. The housewife does not do this.

In the claims to follow, the term "cooking" is used to designate any kind of heating process, whether used in domestic cooking ranges, in industrial ovens, or other heating devices. The term "heating element" is broadly used to designate any relay, solenoid, synchronized conveyor control circuit, or other industrial device whose motion is to be controlled. This application discloses and claims certain improvement on the devices of patents to Brown and Carson Nos. 2,194,586 and 2,194,587 of March 26, 1940.

I would state in conclusion that, while the example illustrated constitutes a practical embodiment of my invention, I do not wish to limit myself precisely to these details since manifestly the same may be considerably varied without departing from the spirit of the invention as defined in the appended claims.

Having thus described my invention, I claim as new and desire to secure by Letters Patent:

1. In a device of the class described, the combination of a motor, a first switch having two contacts one of which is reciprocable by the motor to and from engagement with the other contact to intermittently open and close a circuit, a second switch having two contacts one of which is adjustable to engage the other and close a circuit through which current is suppliable to the motor, and first and second independently rotatable members the first of which is manually adjustable rotatably to vary the distance that the reciprocable contact of the first switch is separable from its mating contact, the second of said members being manually adjustable rotatably to various selectable positions of displacement from a normal position thereof to engage the adjustable contact of the second switch with its mating contact, the said motor having a slippable connection with the second member by which the latter member is returnable to said predetermined position during an interval of time which varies with the extent of displacement of said second member from its said normal position, and means for holding the said second switch closed during such return of the second member to said predetermined position thereof.

2. A device as described in claim 1 in which the first and second members thereof are coaxial.

3. A device as described in claim 1 in which one of said members thereof has a sleeve portion and the other of said members has a shaft portion extending through said sleeve portion.

4. A device as described in claim 1 in which the first of said coaxial members thereof is bodily adjustable axially by rotation of a threaded adjusting means.

5. A device as described in claim 1 in which said second member includes a cam having projecting means acting upon rotation of said second member from its said normal position to close the said second switch and retain it in the closed position and acting upon return of said second member to its normal position to open said second switch and hold it open.

References Cited in the file of this patent

UNITED STATES PATENTS

| | | |
|---|---|---|
| 1,522,988 | Warren | Jan. 13, 1925 |
| 2,139,454 | McCabe | Dec. 6, 1938 |
| 2,363,326 | Hodgkins | Nov. 21, 1944 |
| 2,410,014 | Clark | Oct. 29, 1946 |
| 2,445,021 | Clark | July 13, 1948 |
| 2,503,082 | Tuttle | Apr. 4, 1950 |
| 2,563,077 | Schwartz | Aug. 7, 1951 |
| 2,563,659 | Bloom | Sept. 29, 1953 |
| 2,723,335 | Hotchkin | Nov. 8, 1955 |

FOREIGN PATENTS

| | | |
|---|---|---|
| 695,819 | Great Britain | Aug. 19, 1953 |